United States Patent
Yokota et al.

(10) Patent No.: US 10,379,270 B2
(45) Date of Patent: Aug. 13, 2019

(54) INTERNAL CHECK MIRROR FOR OVERHEAD BIN AND MANUFACTURING METHOD FOR SAME

(71) Applicant: Komy Co., Ltd., Kawaguchi-shi, Saitama (JP)

(72) Inventors: Tetsuo Yokota, Kawaguchi (JP); Tsuyoshi Watanabe, Kawaguchi (JP)

(73) Assignee: Komy Co., Ltd., Saitama (JP)

( * ) Notice: Subject to any disclaimer, the term of this patent is extended or adjusted under 35 U.S.C. 154(b) by 0 days.

(21) Appl. No.: 15/754,725

(22) PCT Filed: Feb. 12, 2016

(86) PCT No.: PCT/JP2016/054057
§ 371 (c)(1),
(2) Date: Feb. 23, 2018

(87) PCT Pub. No.: WO2017/138135
PCT Pub. Date: Aug. 17, 2017

(65) Prior Publication Data
US 2018/0284329 A1    Oct. 4, 2018

(51) Int. Cl.
*G02B 5/09* (2006.01)
*B29D 11/00* (2006.01)
*B64D 11/00* (2006.01)

(52) U.S. Cl.
CPC .......... *G02B 5/09* (2013.01); *B29D 11/00596* (2013.01); *B29D 11/00269* (2013.01); *B29K 2995/0026* (2013.01); *B64D 11/003* (2013.01)

(58) Field of Classification Search
CPC ... G02B 5/08; G02B 5/09; G02B 5/10; G02B 5/045; G02B 5/1814; B29D 11/00278; B29D 11/00288; B29D 11/00596
See application file for complete search history.

(56) References Cited

U.S. PATENT DOCUMENTS

| | | | | |
|---|---|---|---|---|
| 5,847,889 A | * | 12/1998 | Komiyama | G02B 5/10 359/851 |
| 2005/0078374 A1 | * | 4/2005 | Taira | G02B 5/1814 359/569 |
| 2006/0092510 A1 | * | 5/2006 | Imafuku | G03B 21/10 359/460 |

(Continued)

FOREIGN PATENT DOCUMENTS

| JP | 06-174906 A | 6/1994 |
|---|---|---|
| JP | 09-267800 A | 10/1997 |

(Continued)

*Primary Examiner* — Sultan Chowdhury
(74) *Attorney, Agent, or Firm* — Foley & Lardner LLP (57) ABSTRACT

An internal check mirror for an overhead bin comprises a Fresnel mirror having a convex mirror function which comprises a substrate of a transparent resin, a plurality of minute grooves having V-shaped cross-sections formed on a back surface side of the substrate, a reflective film covering a surface of the plurality of minute grooves and a protective layer covering the reflective film. A thickness of the Fresnel mirror is from 0.1 to 1.0 mm and a radius of curvature based on inclined surfaces of the plurality of the minute grooves is from 200 to 1000 nm. The Fresnel mirror has a width direction dimension of from 200 to 800 mm and a longitudinal directional dimension of from 150 to 600 mm.

11 Claims, 6 Drawing Sheets

(56) References Cited

U.S. PATENT DOCUMENTS

| | | | |
|---|---|---|---|
| 2007/0177263 A1* | 8/2007 | Ono | G02B 3/0068 |
| | | | 359/457 |
| 2011/0228403 A1* | 9/2011 | Masuda | B60R 1/001 |
| | | | 359/630 |
| 2012/0092785 A1 | 4/2012 | Komiyama et al. | |
| 2015/0007736 A1 | 1/2015 | Takakura | |
| 2016/0282616 A1* | 9/2016 | Matsushita | G02B 27/0101 |

FOREIGN PATENT DOCUMENTS

| | | |
|---|---|---|
| JP | 2008-134290 A | 6/2008 |
| JP | 2008-260295 A | 10/2008 |
| JP | 2008-292665 A | 12/2008 |
| JP | 2013-212605 A | 10/2013 |
| JP | 5511041 B1 | 6/2014 |
| WO | WO 2011/086740 A1 | 7/2011 |

\* cited by examiner

INTERNAL CHECK MIRROR FOR OVERHEAD BIN AND MANUFACTURING METHOD FOR SAME

CROSS-REFERENCE TO RELATED APPLICATIONS

This application is a National Stage application of PCT/JP2016/054057, filed Feb. 12, 2016.

TECHNICAL FIELD

The present invention relates to an internal check mirror for an overhead bin and a method for manufacturing the same, and more precisely, relates to an internal check mirror for an overhead bin that makes it possible to increase the size of a mirror image while having substantially equivalent weight to a conventional one, and a method for manufacturing the same.

BACKGROUND ART

A Fresnel mirror which is planar and serves as a convex mirror or a concave mirror is known (see, for example, Patent literature 1). On one surface of a substrate of a transparent resin of the Fresnel mirror, a plurality of annular minute grooves are concentrically arrayed. The minute grooves have V-shaped cross-sections and have a surface which is covered with a reflective layer. The Fresnel mirror that serves as the convex mirror is planar, but has an advantage that a wide-angle image is reflected in the mirror, and thus, for example, the Fresnel mirror is attached, in a planar manner, to an internal wall of an overhead bin of a passenger aircraft or the like and is used as the internal check mirror for confirming whether or not any baggage has been left in the overhead bin (see, for example, Patent literature 2).

In some large passenger aircraft, the number of seats ranges from 500 to 800, for each 2 to 3 seats, an overhead bin is provided, and an internal check mirror is provided in the overhead bin. Therefore, the weight of each Fresnel mirror which is attached to the overhead bin is preferably as light as possible in order to reduce a weight load to the passenger aircraft.

A substrate of the Fresnel mirror of a conventional internal check mirror is manufactured through injection molding using a molten resin from the viewpoint of productivity. However, in the injection molding, since the molten resin receives a high flow resistance in a die, a substrate having a thickness of more than about 1.6 mm cannot be molded without causing an unevenness in thickness. Due to the limitation in the thickness and the weight limitation per one mirror described above, an area (vertical dimension×horizontal dimension) of the substrate which can be manufactured through the injection molding is also naturally limited, and the area is limited to 170 mm×170 mm, 150 mm×200 mm and the like.

As described above, to check an entire area of the overhead bin using the internal check mirror which includes the substrate with the limited area, a radius of curvature of a virtual arc of the Fresnel mirror needs to be smaller than 200 mm. This reduces a size of the image reflected in the internal check mirror, and thus, when a piece of baggage in the overhead bin is small, there is a problem that the small baggage is missed.

Further, as another problem, when the thickness of the substrate is large to exceed 1.6 mm, the baggage is caught at the mirror when the baggage is taken in and out, and this results in falling off and a damage of the internal check mirror. Further, when the internal check mirror largely projects from a surface of the internal wall, there is a problem that an appearance is also deteriorated.

CITATIONS LIST

Patent Literature

Patent literature 1: Japanese Unexamined Patent Publication No. H06-174906
Patent literature 2: Japanese Unexamined Patent Publication No. H09-267800

SUMMARY OF THE INVENTION

Technical Problem

The object of the present invention is to provide an internal check mirror for an overhead bin that makes it possible to increase the size of a mirror image while having substantially equivalent weight to a conventional one.

Another object of the present invention is to provide an internal check mirror for an overhead bin which solves a problem of the baggage being caught at the mirror when the baggage is taken in and out and a deterioration in an appearance.

Still another object of the present invention is to provide a method for manufacturing the internal check mirror for an overhead bin for achieving the above described objects.

Solution to Problem

The internal check mirror for an overhead bin according to the present invention for achieving the above described objects comprises a Fresnel mirror having a convex mirror function which comprises a substrate of a transparent resin, a plurality of minute grooves having V-shaped cross-sections formed on a back surface side of the substrate, a reflective film covering a surfaces of the plurality of the minute grooves and a protective layer covering the reflective film, wherein a thickness of the Fresnel mirror is from 0.1 to 1.0 mm and a radius of curvature of a virtual arc based on inclined surfaces of the plurality of the minute grooves is from 200 to 1000 mm.

A method for manufacturing the internal check mirror for an overhead bin according to the present invention comprises the steps of: molding a transparent resin by melt extrusion to form a transparent resin film; press-molding the transparent resin film to form a substrate having one surface on which a plurality of minute grooves having V-shaped cross-sections are formed; and manufacturing the internal check mirror for an overhead bin by using the substrate.

Advantageous Effects of the Invention

By using a Fresnel mirror having an ultra-thin thickness of from 0.1 to 1.0 mm, the internal check mirror for an overhead bin according to the present invention makes it possible to increase a mirror area while having substantially equivalent weight to a conventional one. Additionally, by making a radius of curvature of a virtual arc based on inclined surfaces of the plurality of minute grooves of the Fresnel mirror to be from 200 to 1000 mm which is larger than that of a conventional internal check mirror, and by a synergy with the increase of the above-mentioned area, a size of an image reflected in the mirror is able to more increased than a size of an image reflected in the conventional internal check mirror. Therefore, even when a piece of baggage is small, the small baggage is easily visible.

Further, the Fresnel mirror has the ultra-thin thickness to minimize an amount of projection from the internal wall surface of the internal check mirror an overhead bin, and thus, the baggage is no longer caught at the internal check mirror when the baggage is taken in and out. Still further, the deterioration in the appearance may also be solved.

According to the method for manufacturing the internal check mirror for an overhead bin of the present invention, a transparent resin is molded by melt extrusion to form a transparent resin film, and the transparent resin film is press-molded to form a substrate having one surface on which a plurality of minute grooves having V-shaped cross-sections are formed, and thus, using such a substrate, an ultra-thin internal check mirror for an overhead bin can be easily manufactured.

DESCRIPTION OF EMBODIMENTS

Hereinafter, the present invention is described below based on embodiments represented in the drawings.

Figure 1:
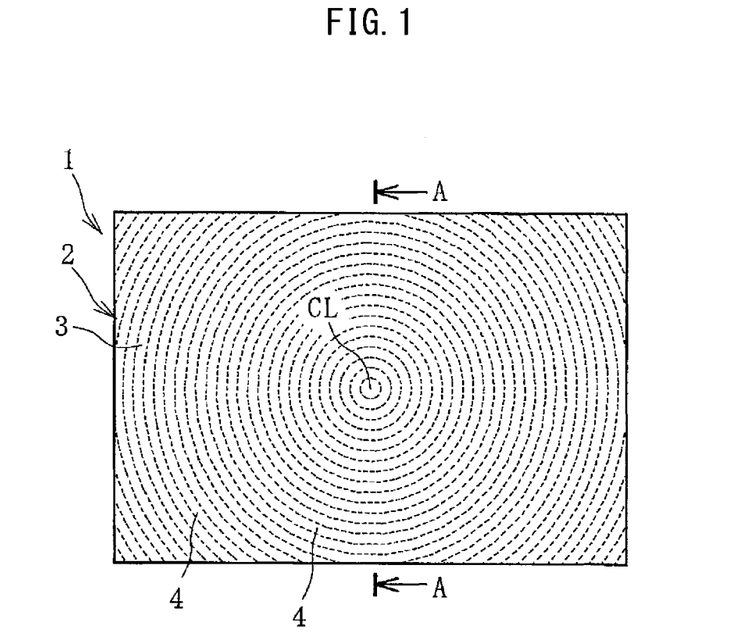
FIG. 1 is a plan view exemplifying an internal check mirror for an overhead bin according to the present invention.
Figure 2:
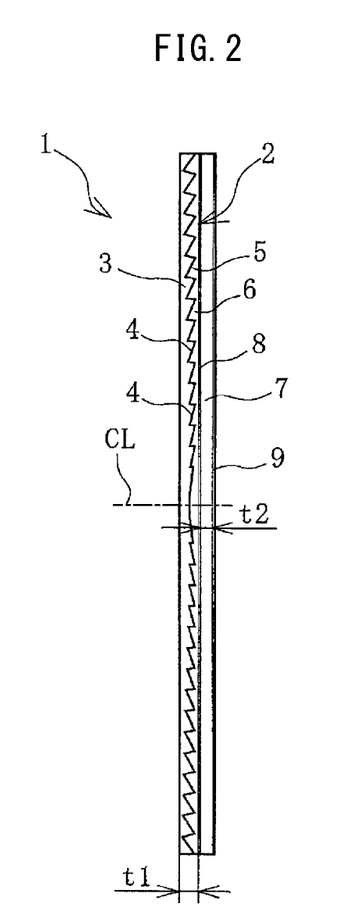
FIG. 2 is a sectional view taken along line A-A of FIG. 1.
Figure 3:
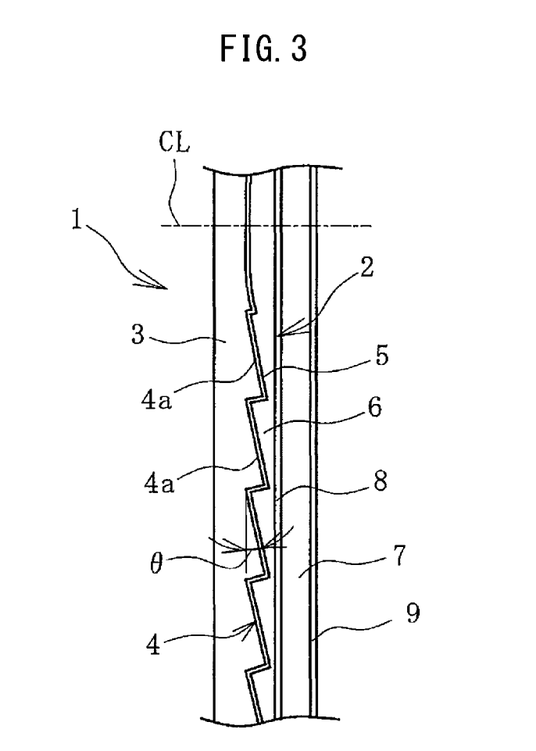
FIG. 3 is a partially enlarged view of FIG. 2.

An internal check mirror 1 for an overhead bin (hereinafter also referred to as "internal check mirror 1") of the present invention exemplified in FIG. 1 to FIG. 3 is configured from a Fresnel mirror 2 which has a planar shape and also a so-called reflex function of the convex mirror. CL illustrated in the drawings indicates the center of a plurality of concentrically arrayed annular minute grooves 4 that configure the Fresnel mirror 2. The position of the center CL does not always correspond to a position of the center of the Fresnel mirror 2 having a quadrangular shape, but may be an eccentrically located position depending on the position where the mirror is attached to the internal wall surface of the overhead bin. The Fresnel mirror 2 preferably has a rectangular shape as exemplified in FIG. 1 as viewed on plane, but may have various shapes such as a circle, an ellipse, and a trapezoid.

The Fresnel mirror 2 comprises a substrate 3 of a transparent resin, a plurality of annular minute grooves 4 having V-shaped cross-sections formed on a back surface side of the substrate 3, a reflective film 5 covering the surface of the plurality of minute grooves 4, and a protective layer 6 covering the back surface of the reflective film 5. The center CL of the Fresnel mirror 2 is a center of concentric circles formed by a plurality of annular minute grooves 4 which is concentrically arrayed. The Fresnel mirror 2 has a thickness of from 0.1 to 1.0 mm, and has an ultra-thin thickness compared to a thickness of a conventional Fresnel mirror that has been used in the overhead bin. In this way, the Fresnel mirror 2 is ultra-thin, and thus, while it weighs substantially equal to that of the conventional internal check mirror, the area is more enlarged than an area of the conventional internal check mirror. The enlarged area (width direction dimension×longitudinal directional dimension) has a width direction dimension of from 200 to 800 mm and a longitudinal directional dimension of from 150 to 600 mm.

The Fresnel mirror 2 may be singly attached to the internal wall surface of the overhead bin, but may be preferably attached to the internal wall surface via a rigid plate 7 bonded to the back surface of the Fresnel mirror as illustrated in FIG. 2. The ultra-thin Fresnel mirror 2 tends to bend and has poor shape stability. Therefore, an operation for pasting the mirror on the wall surface is sometimes not stable and a fine convexo-concave sometimes appears on the wall surface side of the surface of the attached Fresnel mirror 2. These problems can be solved by bonding the rigid plate 7 to the back surface of the Fresnel mirror 2.

The rigid plate 7 to be bonded to the Fresnel mirror 2 may be preferably a plate that is an appropriately bendable and has an appropriate elastic recovery instead of a plate which is completely rigid to not allowing deformation. For example, a sheet-like fiber-reinforced resin composite material, thin metal plate, resin plate and the like are used. As the fiber-reinforced resin composite material, a carbon fiber-reinforced composite material formed by paralleling a carbon fiber bundle in one direction to form a sheet and impregnating the sheet with a thermosetting resin, and curing the thermosetting resin is preferable, since it is light and has no warpage or torsion.

A thickness t2 of the rigid plate 7 is preferably from 0.1 to 1.0 mm, more preferably from 0.1 to 0.5 mm. The rigid plate 7 may be bonded to the Fresnel mirror 2 via an adhesive 8. The total thickness of the bonded Fresnel mirror 2, the adhesion layer 8 and the rigid plate 7 is preferably 0.2 mm or more to 1.0 mm or less. As an adhesion layer 8, a double-coated adhesive tape or a adhesive material is used, and the thickness of the adhesion layer 8 is preferably from 0.01 to 0.1 mm.

An adhesive member 9 is used to attach, to the internal wall surface of the overhead bin, the Fresnel mirror 2 singly or the bonded Fresnel mirror 2 and the rigid plate 7. Examples of the adhesive member 9 include a double-coated adhesive tape, an adhesive material and the like. The adhesive member 9 may be provided to the entire back surface of the Fresnel mirror 2 or the entire back surface of the bonded Fresnel mirror 2 and the rigid plate 7, or may be partially provided only to the periphery. When a double-coated adhesive tape is the adhesive member 9, the thickness of the adhesive member 9 is from 0.01 to 0.4 mm, preferably from 0.01 to 0.1 mm.

As the transparent resin forming the substrate 3 of the Fresnel mirror 2, polycarbonate resin (PC), polyacrylic resin (PMMA), polyethylene resin (PE), poly(ethylene terephthalate) resin (PET) and the like are used.

A plurality of annular minute grooves 4 which have different diameters and are formed on the substrate 3 are concentrically arranged with respect to the center CL, an inclination angle θ between the inclined surface 4a of the minute grooves 4 and the surface direction of the substrate 3 sequentially is large as the inclined surface is away from the center CL, whereby the Fresnel lens is formed. The inclined surface 4a of the Fresnel lens is covered with a reflective film 5 and then the reflective film 5 is covered with a protective layer 6 to form a Fresnel mirror 2.

Each of the minute grooves 4 is arrayed at an interval of not more than 1 mm, and preferably arrayed at an interval of from 0.1 to 0.5 mm. When the Fresnel mirror 2 is taken into pieces and only the inclined surfaces 4a are connected while having the inclination angle θ, an arc of an ultra polygon is formed. A circle inscribed to the arc of the ultra polygon corresponds to the virtual arc of the present invention and a radius of the virtual arc corresponds to the radius of curvature.

As described above, the Fresnel mirror 2 of the present invention has an ultra-thin thickness from 0.1 to 1.0 mm, and thus, even when the weight of the Fresnel mirror is substantially equal to that of the conventional internal check mirror, the area can be larger than the area of the conventional internal check mirror. The enlarged area has a width direction dimension of from 200 to 800 mm and a longitudinal directional dimension of from 150 to 600 mm.

Since the area of the Fresnel mirror 2 is larger than the area of the conventional internal check mirror, even if the radius of curvature of the virtual arc is from 200 to 1000 mm which is larger than that of the conventional internal check mirror, the entire area of the overhead bin is visible. Since the radius of curvature of the virtual arc is larger than that of the conventional internal check mirror, a size of an image reflected in the Fresnel mirror is larger than that reflected in the conventional internal check mirror, whereby the visibility is enhanced. The radius of curvature of the virtual arc may be more preferably from 200 to 500 mm.

Figure 4:
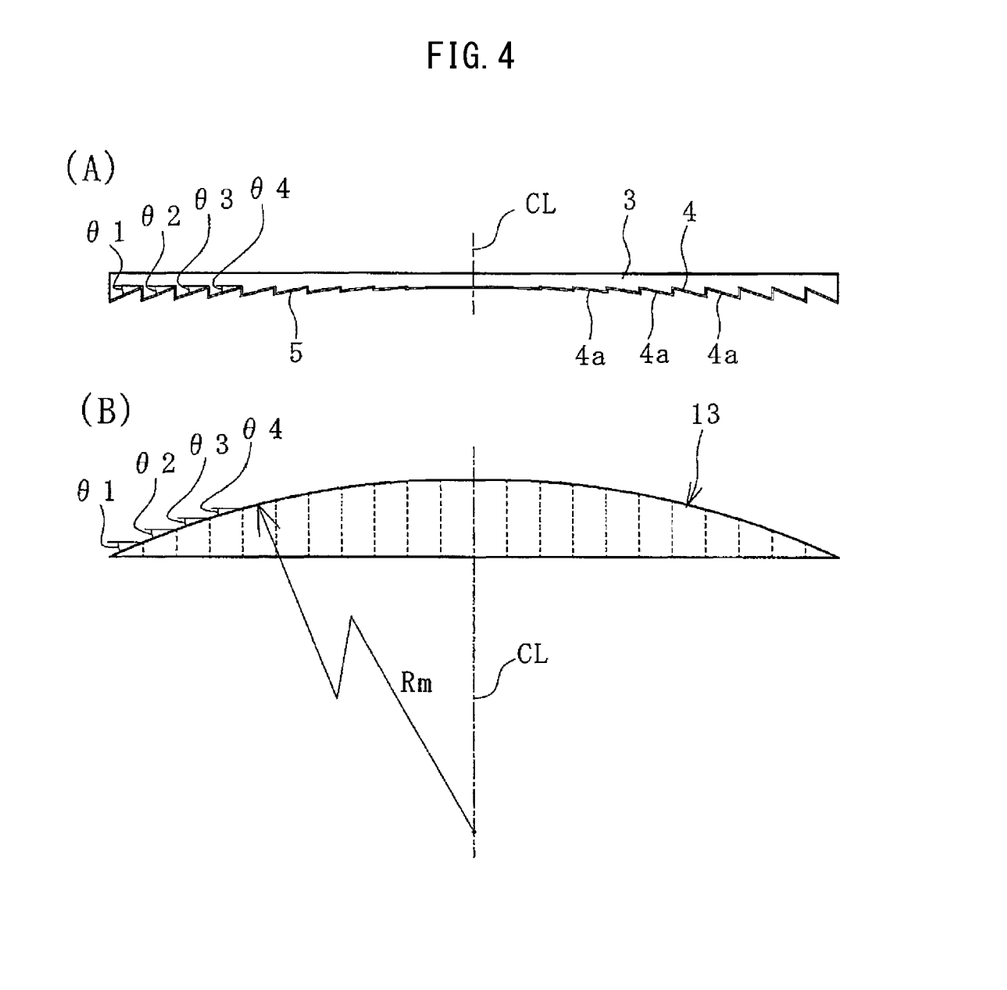
FIG. 4 is an explanatory drawing illustrating a constitutive principle of the internal check mirror for an overhead bin according to the present invention which has a convex mirror function.

The description of the radius of curvature of the virtual arc is complemented with reference to FIG. 4. FIG. 4(A) is the sectional view of only the substrate 3 of the Fresnel mirror 2 and FIG. 4(B) is the sectional view of a hemispherical convex mirror 13. The Fresnel mirror 2 of FIG. 4(A) is formed based on the convex mirror 13 of FIG. 4(B). As illustrated in FIG. 4(B), the convex mirror 13 having the radius of curvature Rm is divided at regular intervals in a direction orthogonal to an axis of the center CL to form a number of toric narrow-width pieces. While maintaining inclination angles θ1, θ2, θ3, θ4, . . . which are formed between a tangent at a middle point of a divided narrow-width piece in a width direction and the direction orthogonal to an axis of the center CL, the planarly rearrangement is made as illustrated in FIG. 4(A). FIG. 4(A) illustrates that, on a back surface of the planar substrate 3, a plurality of toric inclined surfaces 4a are adjacently arrayed in a radius direction from the center CL to form minute grooves 4 having V-shaped cross-sections and on the surface thereof, a reflective layer 5 is laminated. This forms a plurality of toric reflective surfaces and an aggregate of the reflective surfaces exerts a function of a convex mirror as a Fresnel mirror. Note that the method of dividing the convex mirror 13 into a plurality of toric narrow-width pieces is not limited to the above described method, but it is possible to employ a method of dividing, for example, a peripheral surface of the convex mirror 13 in a circumferential direction at regular intervals to obtain a plurality of narrow-width pieces.

Since the Fresnel mirror 2 is formed as described above, an increase in the radius of curvature of the virtual arc of the Fresnel mirror 2 is equal to an increase in the radius of curvature Rm of the convex mirror 13, and although a visible range with the mirror image is small, an image reflected in the Fresnel mirror 2 is large. On the other hand, a decrease in the radius of curvature of the virtual arc of the Fresnel mirror 2 is equal to the decrease in the radius of curvature Rm of the convex mirror 13, and thus, although a visible range with the mirror image is wide, an image reflected in the Fresnel mirror 2 is small.

Figure 5:
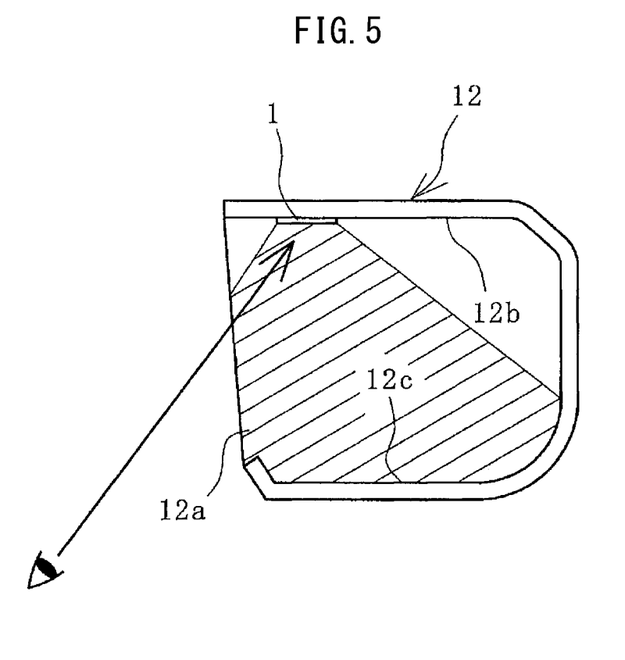
FIG. 5 is an explanatory drawing exemplifying the inside of the overhead bin provided with the internal check mirror of FIG. 1 as viewed from the side.
Figure 6:
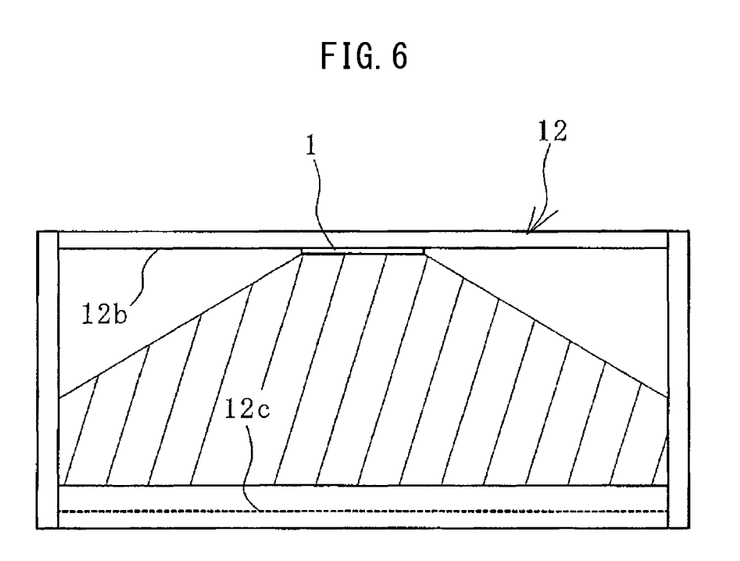
FIG. 6 is an explanatory drawing exemplifying the inside of the overhead bin provided with the internal check mirror of FIG. 1 as viewed from the front.

As exemplified in FIG. 5 and FIG. 6, the internal check mirror 1 of the present invention is attached to the wall surface of ceiling 12b of the overhead bin 12 positioned above a seat in the passenger aircraft such that the entire area above a bottom surface 12c of overhead bin is visible. In this embodiment, the internal check mirror 1 is attached to the wall surface of ceiling 12b of the overhead bin 12 such that the internal check mirror is at the center in the width direction and nearer to the opening 12a in a depth direction. The baggage in the overhead bin 12 can be checked by viewing an image reflected in the internal check mirror 1.

The internal check mirror 1 according to the present invention is applicable not only to the overhead bins installed to the passenger aircraft, but also to the overhead bins installed to other passenger vehicles such as a railway train and a motor coach.

The internal check mirror 1 according to the present invention has the Fresnel mirror 2 having an ultra-thin thickness from 0.1 to 1.0 mm, and thus, while it weighs substantially equal to that of the conventional internal check mirror, an area of the mirror is enlarged. The enlargement in the mirror area leads to the enlargement in a field of vision, and since the radius of curvature of virtual arc based on inclined surfaces 4a of a plurality of minute grooves 4 is from 200 to 1000 mm which is larger than that of the conventional internal check mirror, an image reflected in the internal check mirror is larger than an image reflected in the conventional internal check mirror. Accordingly, a visibility is enhanced, and even when baggage is small, the baggage is never missed.

The Fresnel mirror 2 has the ultra-thin thickness to minimize an amount of projection from the internal wall surface of the internal check mirror 1 and accordingly the baggage is no longer caught at the mirror when the baggage is taken in and out. Further, the deterioration in the appearance due to the projection from the internal check mirror 1 can be solved.

The ultra-thin thickness of the Fresnel mirror 2 leads to a large flexibility, and thus, even when internal wall surface of the overhead bin is curved, the mirror can be attached to the curved surface in a following manner. According to the embodiment, even when the mirror is bonded to the rigid plate 7, the mirror can be attached to the curved surface if the total thickness of the rigid plate 7 and the mirror is from 0.2 to 1.0 mm.

Figure 7:
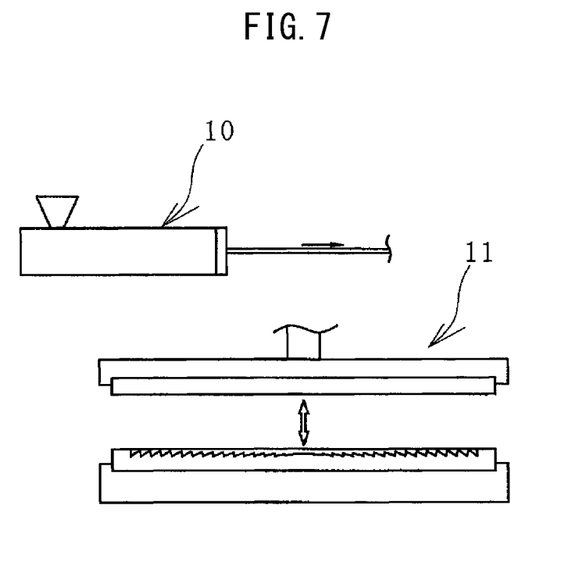
FIG. 7 is an explanatory drawing exemplifying a device for manufacturing a substrate of FIG. 1.

Next, the method for manufacturing the internal check mirror of the present invention is described based on the embodiment of FIG. 7.

The internal check mirror 1 according to the present invention comprising a Fresnel mirror 2 having a thickness of from 0.1 to 1.0 mm may not be formed by the conventional injection molding because the flow resistance of the molten resin is too high. According to the manufacturing method of the present invention as exemplified in FIG. 7, the substrate can be easily manufactured by two steps: a step of extrusion-molding the transparent resin using a melt-extruder 10 to form the transparent resin film, and a step of press-molding the transparent resin film using a press molding machine 11 to emboss a plurality of minute grooves 4 having V-shaped cross-sections. In the melt-extruder 10, the extrusion-molded film is subsequently stretched in a longitudinal direction and a lateral direction to form an ultra-thin film having a uniform thickness. Accordingly, the ultra-thin and high-quality substrate 3 without an unevenness in thickness can be manufactured although the productivity is low because two steps are needed instead of manufacturing the substrate only through one step as the conventional injection molding. Then, a plurality of minute grooves 4 formed on the substrate 3 are covered with a reflective film 5, and then the reflective film 5 is further covered with a protective layer 6 to form a finished product, i.e., the Fresnel mirror 2.

REFERENCE SIGNS LIST

1 Internal check mirror for an overhead bin
2 Fresnel mirror
3 Substrate
4 Minute groove
4a Inclined surface
5 Reflective film
6 Protective layer
7 Rigid plate
8 Adhesion layer
9 Adhesive member
10 Melt-extruder
11 Press molding machine
12 Overhead bin
12a Opening
12b Wall surface of ceiling
12c Bottom surface of overhead bin
13 Convex mirror

The invention claimed is:

1. An internal check mirror for an overhead bin comprising a Fresnel mirror having a convex mirror function which comprises a substrate of a transparent resin, a plurality of minute grooves having V-shaped cross-sections formed on a back surface side of the substrate, a reflective film covering a surface of the plurality of minute grooves and a protective layer covering the reflective film, wherein a thickness of the Fresnel mirror is from 0.1 to 1.0 mm and a radius of curvature based on inclined surfaces of the plurality of the minute grooves is from 200 to 1000 mm, and wherein the Fresnel mirror has a width direction dimension of from 200 to 800 mm and a longitudinal directional dimension of from 150 to 600 mm.

2. The internal check mirror for an overhead bin according to claim 1, wherein the radius of curvature is from 200 to 500 mm.

3. The internal check mirror for an overhead bin according to claim 1, wherein a rigid plate is bonded to a back surface of the Fresnel mirror.

4. The internal check mirror for an overhead bin according to claim 3, wherein a thickness of the rigid plate is from 0.1 to 1.0 mm, and a total thickness of the Fresnel mirror, the rigid plate, and an adhesion layer that is interposed between the Fresnel mirror and the rigid plate is from 0.2 to 1.0 mm.

5. The internal check mirror for an overhead bin according to claim 4, wherein a thickness of the rigid plate is from 0.1 to 0.5 mm.

6. The internal check mirror for an overhead bin according to claim 3, wherein the rigid plate is a fiber-reinforced resin composite material.

7. The internal check mirror for an overhead bin according to claim 6, wherein the fiber-reinforced resin composite material is a carbon-fiber-reinforced resin composite material.

8. The internal check mirror for an overhead bin according to claim 1, which is attached to an internal wall surface of the overhead bin that is installed above a seat in a passenger vehicle.

9. The internal check mirror for an overhead bin according to claim 8, wherein the passenger vehicle is a passenger aircraft.

10. A method for manufacturing an internal check mirror for an overhead bin, the internal check mirror having a structure defined by claim 1, the method comprising the steps of:
  molding a transparent resin by melt extrusion to form a transparent resin film;
  press-molding the transparent resin film to form the substrate having one surface on which the plurality of minute grooves having V-shaped cross-sections are formed; and
  manufacturing the internal check mirror for the overhead bin by using the substrate.

11. An internal check mirror for an overhead bin comprising a Fresnel mirror having a convex mirror function which comprises a substrate of a transparent resin, a plurality of minute grooves having V-shaped cross-sections formed on a back surface side of the substrate, a reflective film covering a surface of the plurality of minute grooves and a protective layer covering the reflective film, wherein a thickness of the Fresnel mirror is from 0.1 to 1.0 mm and a radius of curvature based on inclined surfaces of the plurality of the minute grooves is from 200 to 1000 mm, wherein a rigid plate is bonded to a back surface of the Fresnel mirror, and wherein a thickness of the rigid plate is from 0.1 to 1.0 mm, and a total thickness of the Fresnel mirror, the rigid plate, and an adhesion layer that is interposed between the Fresnel mirror and the rigid plate is from 0.2 to 1.0 mm.

* * * * *